United States Patent [19]

Yagi

[11] Patent Number: 4,847,760
[45] Date of Patent: Jul. 11, 1989

[54] ELECTRONIC DEVICE FOR STORING PERSONAL INFORMATION

[75] Inventor: Shigeki Yagi, Tokyo, Japan

[73] Assignee: Seiko Instruments Inc., Tokyo, Japan

[21] Appl. No.: 81,293

[22] Filed: Aug. 3, 1987

[30] Foreign Application Priority Data

Sep. 24, 1986 [JP] Japan .................................. 61-225729

[51] Int. Cl.$^4$ ............................................. G06F 15/02
[52] U.S. Cl. ............................... 364/400; 364/705.01; 364/710.01
[58] Field of Search ................ 364/400, 705, 710, 364

[56] References Cited

U.S. PATENT DOCUMENTS

| 3,999,050 | 12/1976 | Pitroda | 364/419 |
| 4,117,542 | 9/1978 | Klausner | 364/705 |
| 4,276,541 | 6/1981 | Inoue | 364/900 |
| 4,715,010 | 12/1987 | Inoue | 364/705 |

FOREIGN PATENT DOCUMENTS 0086655  5/1983  Japan .................................... 364/705

OTHER PUBLICATIONS

Funkschau, vol. 50, No. 21, Oct. 1978, pp. 1051–1052, K. D. Weber: "Taschenrechner als Kurzzeitwecker".
P. D. del Sol et al., "Native Time-of-Pay for A Data Processor"; IBM Technical Disclosure, vol. 23, No. 5, Oct. 1980.
H. P. Hubbard, "Personal Computer", IBM Technical Disclosure Bulletin, vol. 19, No. 7, Dec. 1976.

Primary Examiner—Jerry Smith
Assistant Examiner—Gail O. Hayes
Attorney, Agent, or Firm—Spensley, Horn, Jubas & Lubitz

[57] ABSTRACT

An electronic reminder comprises a case which can be held by one hand, a read only memory circuit in the case for storing a program, a random access memory circuit in the case for storing and reviewing telephone numbers, appointments and agenda. The information stored in the random access memory is reviewed by display means. The instrument also includes time keeping means for counting a present time and an alarm system. The alarm system comprises a set key, alarm time setting means for setting time which is a present time plus a particular time as an alarm time when the set key depressed, and store means for storing the information reviewed at the time of key depressing. When the present time coincides with the alarm time, the information stored in the store means is displayed by the display means with alarm sound.

3 Claims, 4 Drawing Sheets

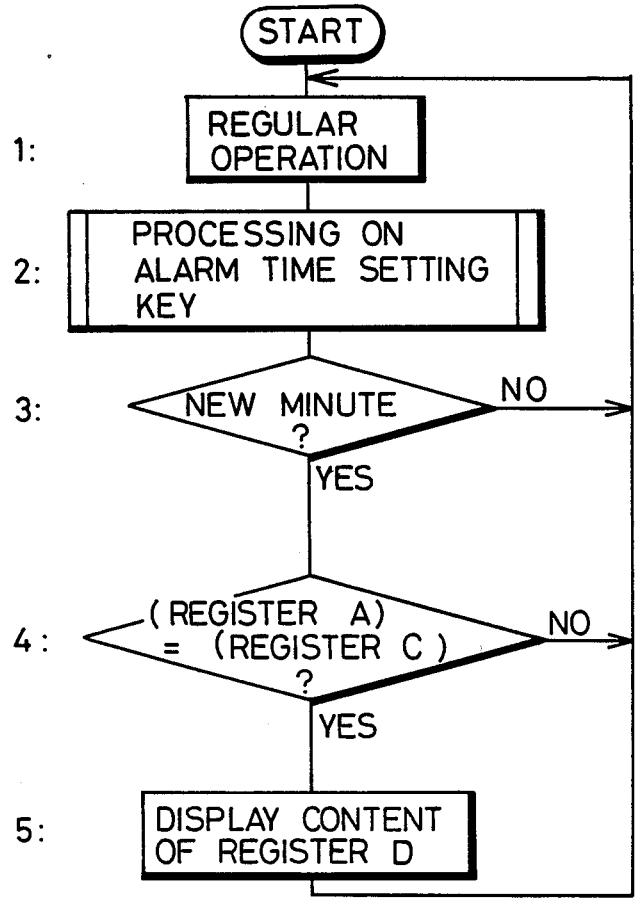

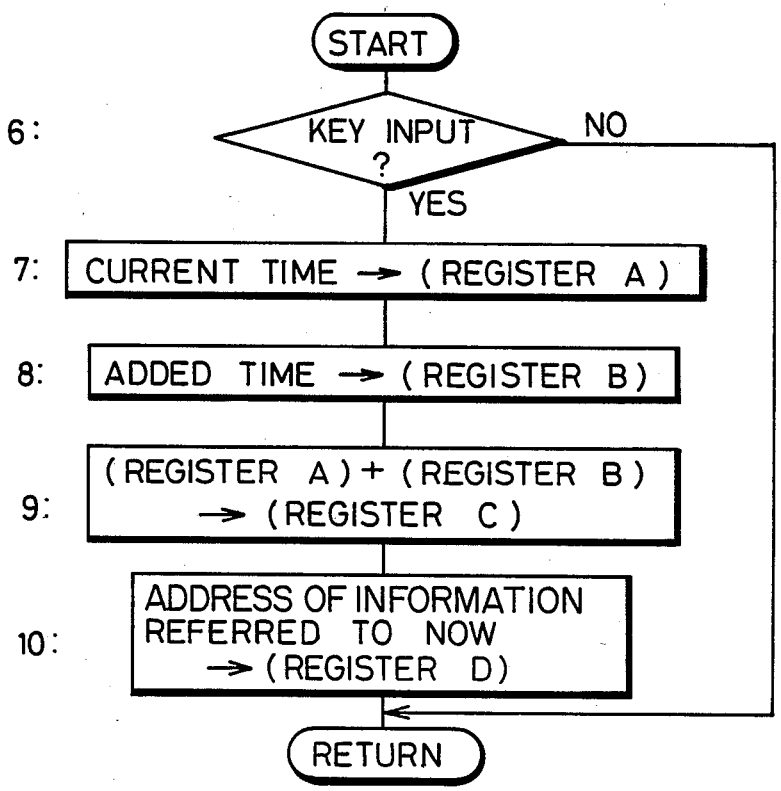

ELECTRONIC DEVICE FOR STORING PERSONAL INFORMATION

BACKGROUND OF THE INVENTION

This invention relates in general to an electronic display apparatus, in particular to an electronic reminder which electrically stores information on person's names, addresses, telephone numbers, etc., and displays the information on request.

In recent years, many kinds of portable electronic display apparatus are available. Electronic diaries and electronic telephone directories are examples of such portable apparatus. An electronic diary which stores schedules and messages, and which displays a message at the scheduled time is disclosed in U.S. Pat. No. 3,999,050. An electronic telephone directory which stores persons' names and telephone numbers, and which retrieves a telephone number in accordance with the designated person's name is disclosed in U.S. Pat. No. 4,117,542.

It often happens that a telephone call to a person results in a busy signal or a recorded message. In such a case, the caller may think that he will call again after a while but is likely to carelessly forget it once he has started another task. Everybody would have such an experience. At such time, it is convenient to use the electronic diary. In a conventional electronic diary, however, setting an alarm time requires a plurality of steps and/or key operations; namely, the operation is complicated.

SUMMARY OF THE INVENTION

It is therefore an object of the present invention to provide an electronic reminder having high operability to set an alarm time.

It is another object of the invention to provide an electronic reminder which is able to set an alarm time by only one key operation.

It is a further object of the invention to provide an electronic reminder which displays information at the time of the alarm time setting when the present time coincides with the alarm time.

The electronic reminder comprises first input means for inputting information, memory means responsive to said first input means for storing said information, displaying means responsive to said memory means for displaying said information stored in said memory means, second inputting means for generating an instruction signal of alarm time setting, time keeping means for counting a present time, alarm time setting means responsive to said second input means and said time keeping means for setting alarm time, object information store means responsive to said second input means for storing the information displayed at the time of depressing said second inputting means in accordance with said instruction signal, comparison means responsive to said time keeping means and said alarm time setting means for comparing the present time with the alarm time, and selective means connected with said object information store means and responsive to said comparison means for sending the content of said object information store means to said displaying means for displaying same when the present time coincides with the alarm time.

These and other objects of the invention will become apparent and obvious to those skilled in the pertinent art upon referring to the following description provided in connection with the accompanying drawings, of which:

BRIEF DESCRIPTION OF DRAWINGS

FIG. 4 is a flow chart showing the flow of processing by the present invention.

FIG. 5 is a flow chart showing the processing on the alarm time setting key.

DESCRIPTION OF PREFERRED EMBODIMENT

Figure 1:
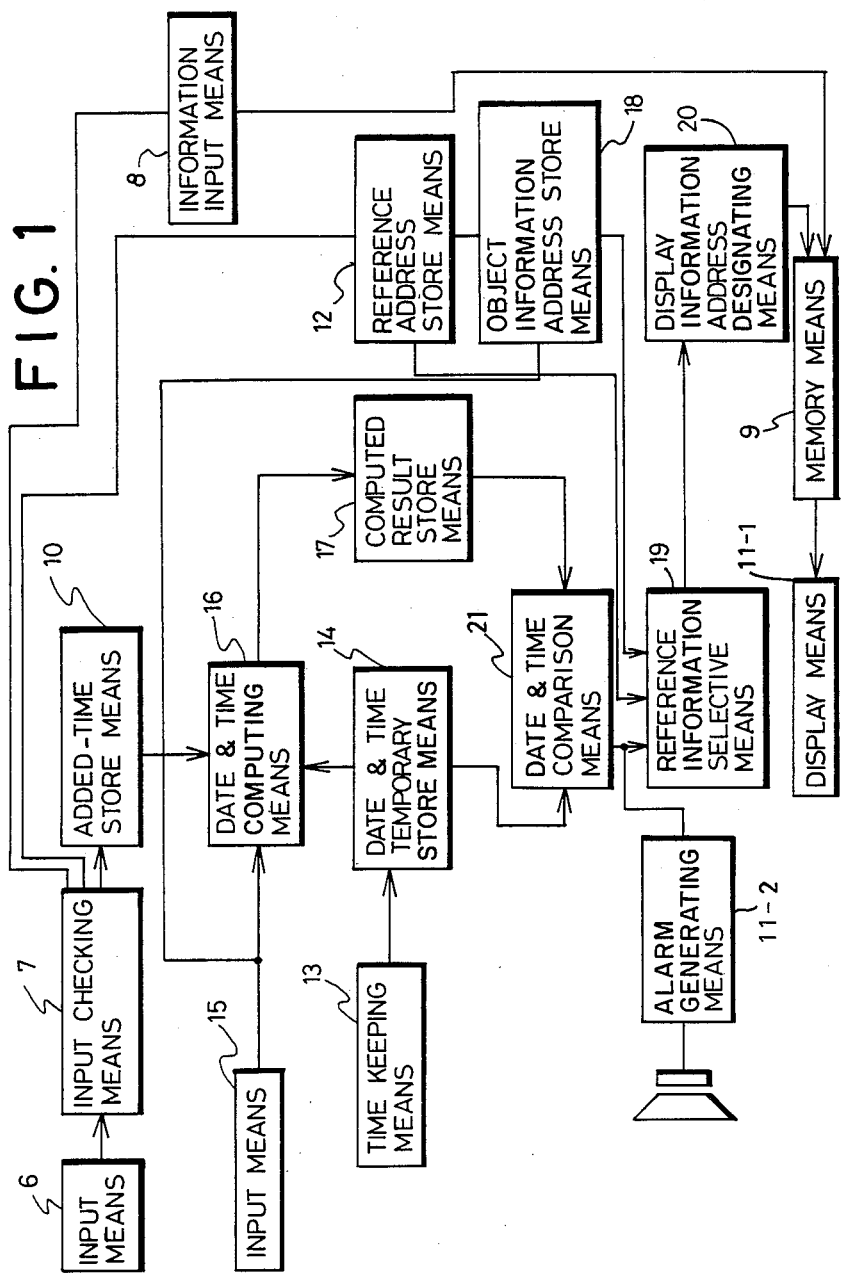
FIG. 1 is a representative functional block diagram of an electronic reminder in accordance with the present invention.

There is shown in FIG. 1 a functional structure of an electronic reminder. The operator inputs into the electronic reminder information on person's names, addresses, telephone numbers, etc., via input means 6 having a plurality of keys comprising ten keys, character keys, and function keys. The electronic reminder has three functional modes. First mode is an information input mode for inputting the information into the reminder. Second mode is an information search mode for retrieving and displaying stored information and displaying them. And last mode is an delay time set mode for setting a alarm delay time. Any mode can be selected by depressing a mode select key. In the input mode, when a key is depressed, input checking means 7 checks which key is depressed and operates information input means 8 so as to store the information into memory means 9. In the search mode, when the return key is depressed after key words have been inputted, input checking means 7 generates a memory address of the information to be stored under the key word. The memory address is sent to a reference address store means 12.

This invention sets as an alarm setting time the current time plus "a particular time" by one keying-in operation. In the delay time set mode, the particular time can be set freely by the operator and is stored in added time store means 10 by input checking means 7.

Figure 2:
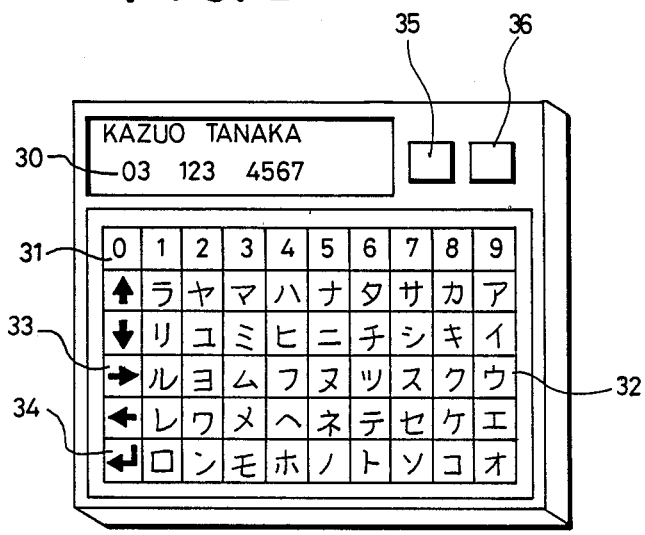
FIG. 2 is a front view of the electronic reminder in accordance with the present invention.

The reminder has a shape to be held by one hand. A plurality of keys and a display panel are arranged on a case. A key arrangement of the reminder is illustrated by way of example in FIG. 2. The display panel 30 is in the upper portion of a front face. The reminder has sixty two keys in this example. The keys comprise ten numerical keys 31, forty five Japanese character keys 32, four cursor keys 33, a return key 34, a mode select key 35 and an alarm set key 36 for setting the time which is currenttime plus "a particular time" as the alarm time.

The information already input can be taken out and displayed on the display panel 30 of the display means 11-1. The memory address of the displayed information is usually stored in a reference address store means 12. The address in the store means 12 is changeable by the key operation of the input means 6. The memory address in the reference address store means 12 is written into an object information address store means 18 when second input means 15 is depressed.

Time keeping means 13 serves as a clock and rewrites the content of date and time temporary store means 14 at intervals of one second. When second input means 15 is depressed, a time computing means 16 adds the content of the added time store means 10 to the content of the date and time temporary store means 14. The results of the calculation is stored in computed result store means 17 as an alarm time.

Date and time comparison means 21 compares the present time stored in the temporary store means 10 with the alarm time stored in the computed result store means 17, and sends control signals to an alarm generating means 11-2 and reference information selective means 19 when the present time coincides with the alarm time. The alarm generating means 11-2 generates drive signals for driving a buzzer when the control signal is inputted. The reference information selective means 19 receives the address sent from the reference address store means 12 and the address sent from the object information address store means 18. Usually the selective means 19 outputs the address sent from the reference address store means 12. But the selective means 19 outputs the address sent from the object information address store means 18, when the control signal from the comparison means 21 is inputted. The output address of the selective means 19 is sent to display address designating means 20. The designating means 20 addresses the information in the memory means 9. The information designated by the address is displayed by the display means 11-1 on the display panel 30.

Figure 3:
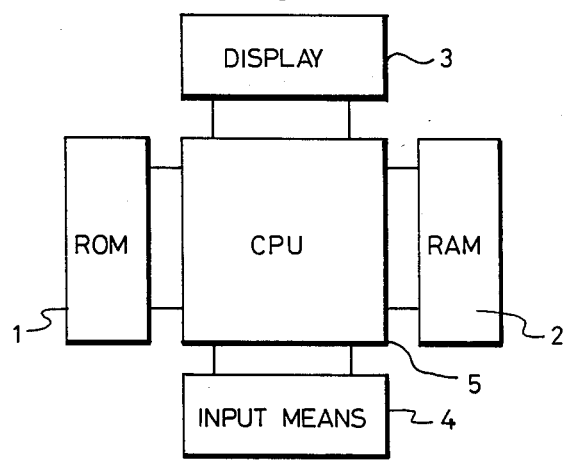
FIG. 3 is a rough circuit diagram showing one embodiment of this invention.

FIG. 3 is a block diagram of the electronic reminder which includes a read only memory (ROM) 1 for storing a program, a random access memory (RAM) 2 for storing various information, and a central processing unit (CPU) 5 for executing the program stored in the ROM 1, for displaying particular information on a display 3, and for decoding the information from input means 4.

The operation occurring when the operator works second input means 15 will be described using one specific example.

First, assume that the operator is now reviewing to the information "Kazuo Tanaka 03-123-4567" to make a telephone call to Mr. Tanaka. Further assume that the operator made a telephone call to Mr. Tanaka in accordance with the displayed number, but unfortunately she could not contact Tanaka. The operator gave up talking now at once with Mr. Tanaka and considered that she would make a telephone call again after a while. Thus she pressed the alarm time setting key 36 included in the second input means 15 so as not to forget it. When the second input means 15 is operated by the operator, the data and time computing means 16 adds the content of added time store means 10 to the content of data and time temporary store means 14 and stores the result in the computed result store means 17. Also assume that the time when the operator pressed the alarm time setting key was 3:00 PM, October 10 and that the present time to be added was 15 minutes, the information stored in the computed result store means 17 is then 3:15 PM, October 10. At the same time the object information address store means 18 receives address information as to where the content of reference address store means 12, namely "Kazuo Tanaka 03-123-4567" is stored.

Thereafter the operator may input a new person's name or telephone number or review other information inputted already. Therefore, the content of reference address store means 12 may at once turn into an address different from the address stored in the object information address store means 18.

Usually, the reference information selective means 19 selects reference address store means 12 and delivers the address information to display information address designating means 20.

The designated means 20 takes out information to be referred to from the memory means 9 and the information is displayed by the display means 11-1.

The date and time comparison means 21 compares the content of date and time temporary store means 14 with the content of computed result store means 17. In this particular embodiment, when 15 minutes have elapsed since the alarm time setting key was pressed the contents of the two store means coincide. At this time, the reference information selective means 19 selects as reference information the information in store means 18 and the alarm generating means 11-2 generates an alarm signal. As a result, display means 11-1 again displays "Kazuo Tanaka 03-123-4567" and at the same time an alarm sound is generated.

FIGS. 4 and 5 show the above operation in a flowchart. The CPU 5 performs at all times regular operations including inputting, referring to information, etc. (step 1 in FIG. 4), the processing on "alarm time setting" key (step 2), and the processing of the timekeeping result (steps 3, 4, and 5). The processing on the "alarm time setting" key is as shown in FIG. 5.

First, it is checked whether or not the "alarm setting" key is pressed. If so (step 6 in FIG. 5), the content of registers A and B are added and the result is stored in register C (step 9 in FIG. 5). At present, register A contains time information, and (step 7 in FIG. 5) register B contains a time to be added (step 8 in FIG.5).

An address indicating the place where the information referred to at this time is stored is in register D (step 10 in FIG. 5).

At step 3 in FIG.4 the timekeeping result is monitored at all times and it is commanded that the content of register A is compared to the content of register C once per minute (step 4 in FIG. 4). As a result of the comparison at step 4 in FIG. 4, when the content of register A coincides with that of register C, namely, when the current time has reached the alarm setting time, an alarm sound is generated and the storage information designated by the content of register D is displayed (step 5 in FIG. 4). Thereafter the regular operation is resumed.

According to this embodiment, an alarm time setting operation is very much simplified. Namely, one operation can set an alarm time to a predetermined time after the current time. The operability of reminder is improved as well as keying errors due to complex key operation is completely eliminated, so that an electronic reminder very excellent in operability and reliability is provided. It is to be understood that while the present invention has been shown and described with respect to a preferred embodiment thereof, the scope of the invention is not intended to be so limited and other equally suitable and equivalent modifications and changes may be made therein without departing from the spirit and scope of the invention.

What is claimed is:

1. An electronic reminder for storing information and for displaying the same comprising:
   first input means 6 for inputting information,
   memory means 9 responsive to said first input means for storing said information,
   displaying means responsive to said memory means for displaying said information stored in said memory means,
   addressing means connected with said memory means for designating the memory address in which the information to be displayed is stored, reference address store means responsive to manual operation to designate information to be displayed for storing a memory address in which the designated information is stored, second input means 15 for generating alarm setting instruction signals, time keeping means 13 for counting a present time, alarm time setting means responsive to said second input means and said time keeping means for setting an alarm time, object information address store means 18 responsive to said second input means for storing the memory address at which the information displayed at the time of depressing said second input means is stored, said object information address store means having means for writing the content of said reference address store means into said object information address store means in accordance with said instruction signals, comparison means 21 responsive to said time keeping means and said alarm time setting means for comparing the present time with the alarm time, and selective means 19 connected between said object information address store means and said addressing means for sending the content of said object information address store means to said addressing means when the present time coincides with the alarm time.

2. The electronic reminder as claimed in claim 1 further comprising alarm means responsive to said comparison means for generating an alarm sound when the present time coincides with the alarm time.

3. The electronic reminder as claimed in claim 1 wherein said alarm time setting means includes added time store means 10 for storing a time to be added, and time computing means for adding the present time to the added time, and store means for storing the added result as the alarm time.

* * * * *